United States Patent [19]
Kyusho

[11] Patent Number: 4,802,185
[45] Date of Patent: Jan. 31, 1989

[54] TRANSVERSELY EXCITED ATMOSPHERIC LASER

[75] Inventor: Yukio Kyusho, Tokyo, Japan
[73] Assignee: NEC Corporation, Tokyo, Japan
[21] Appl. No.: 66,925
[22] Filed: Jun. 29, 1987

[30] Foreign Application Priority Data

Jun. 27, 1986 [JP] Japan .................. 61-149598

[51] Int. Cl.⁴ .................................. H01S 3/097
[52] U.S. Cl. ............................ 372/86; 372/83; 372/87
[58] Field of Search ............... 372/83, 82, 87, 86

[56] References Cited

U.S. PATENT DOCUMENTS

| | | | |
|---|---|---|---|
| 3,886,479 | 5/1975 | Pearson | 372/86 |
| 3,986,139 | 10/1976 | Meneeby et al. | 372/86 |
| 4,491,949 | 1/1985 | Beck et al. | 372/86 |
| 4,503,542 | 3/1985 | Cirkel et al. | 372/83 |
| 4,554,667 | 11/1985 | Kaminski | 372/83 |
| 4,637,031 | 1/1987 | Gürs et al. | 372/87 |
| 4,686,682 | 8/1987 | Haruta et al. | 372/87 |

FOREIGN PATENT DOCUMENTS 0090482 5/1986 Japan ..................... 372/86

OTHER PUBLICATIONS

Improved Excitation Techniques For Atmospheric Pressure Co₂ Lasers, Electronics Letters, 25th Mar. 1971, vol. 7 Nos. 5/6, pp. 141–142.

Investigations of glow discharge formation with volume preionization, Journal of Applied Physics, vol. 46, No. 4, Apr. 1975, pp. 1567–1574.

*Primary Examiner*—Leon Scott, Jr.
*Attorney, Agent, or Firm*—Sughrue, Mion, Zinn, Macpeak & Seas

[57] ABSTRACT

An atmospheric laser which is transversely excited includes main and preliminary discharge electrodes. Life of laser gas used to promote ionization between the main discharge electrodes is lengthened by providing a sufficient number of preliminary discharge electrodes, at a distance sufficiently close to the main discharge electrodes to promote preliminary ionization in a preliminary discharge space, prior to discharge in the main discharge space. According to preferred embodiments of the invention, one of the rare gases such as He is provided in the preliminary discharge space, and a mixture of $CO_2$, $N_2$, and He is provided in the main discharge. In order to enable the preliminary discharge electrodes to be closer to the main discharge electrodes, air may be used in place of one of the rare gases in the preliminary discharge space, so that the overall apparatus may be made yet smaller.

13 Claims, 2 Drawing Sheets

TRANSVERSELY EXCITED ATMOSPHERIC LASER

FIELD OF THE INVENTION

The invention relates to a transversely excited atmospheric laser, and more particularly to a transversely excited atmospheric laser in which ultraviolet light is utilized for preionization.

BACKGROUND OF THE INVENTION

One type of transversely excited atmospheric laser is described in "IMPROVED EXCITATION TECHNIQUES FOR ATMOSPHERIC PRESSURE $CO_2$ LASER" in "ELECTRONICS LETTERS", Mar. 25, 1971, Vol. 7 Nos. 516. The transversely excited atmospheric laser comprises main electrodes including an anode and cathode having a predetermined length in a longitudinal direction respectively and facing each other with a predetermined gap in parallel, and preliminary discharge electrodes provided in the vicinity of the main electrodes. In the transversely excited atmospheric laser, a high voltage is applied across the preliminary electrodes to produce arc discharge so that ultraviolet light induced by the arc discharge is radiated to the discharge space between the anode and cathode electrodes of the main electrodes, thereby resulting in the ionization of laser gas. As a result, a uniform glow discharge is developed when a high voltage is applied across the main electrodes.

In the transversely excited atmospheric laser, however, the main discharge space between the anode and cathode electrodes and preliminary discharge space between the preliminary discharge electrodes are provided in a single chamber so that laser gas therein is dissociated due to the intensive arc discharges of the preliminary electrodes, thereby shortening the life term of laser gas extremely. Further, it is impossible to control the wavelength of preliminary discharge light, rise time etc. independently because the discharge for preliminary ionization is performed in the same conditions as those of laser gas in the main discharge.

In "Investigations of glow discharge formation with volume preionization" on pages 1567 to 1574 of "Journal of Applied Physics", Vol. 46, No. 4, April 1975, there is described that electron density $N_e(r)$ resulting from preliminary ionization at a point from which an arc discharge source is located with a distance r is expressed in the equation (1).

$$N_e(r) = S_e(N_r)N/r^2 \qquad (1)$$

where $S_e (N_r)$ is the number of photoelectrons per sr Torr cm as a function of the spark parameters, and is determined by geometrical positions of experiment instruments or tools, and N is a molecular number.

Electron density varies as the inverse square of the distance r from a preliminary discharge source. For this reason, it is preferable to adopt a construction in which the preliminary discharge electrodes are as near the main discharge electrodes as possible to promote uniform and intensive preliminary ionization in the main discharge space.

If the preliminary discharge electrodes are made nearer the main discharge electrodes, however, discharge energy which is necessary for the ionization of laser gas is not sufficiently supplied to the main discharge space because unexpected discharge tends to occur at unexpected portions between the preliminary discharge electrodes and the main discharge electrodes.

SUMMARY OF THE INVENTION

Accordingly, it is an object of the invention to provide a transversely excited atmospheric laser wherein the life term of laser gas is lengthened.

It is a further object of the invention to provide a transversely excited atmospheric laser wherein the discharges in preliminary and main discharge electrodes can be performed independently in the different conditions from each other.

It is a still further object of the invention to provide a transversely excited atmospheric laser wherein unexpected discharge is prevented from occurring even if preliminary discharge electrodes are made nearer main discharge electrodes.

According to the invention, a transversely excited atmospheric laser comprises, a main discharge space provided by main discharge electrodes including an anode electrode of a predetermined length in a predetermined direction and a cathode electrode of a predetermined length in said predetermined direction and facing said anode electrode with a predetermined gap in parallel, at least one preliminary discharge space provided by a set of preliminary discharge electrodes, each of said set of preliminary discharge electrodes including a pair of electrodes facing each other with a predetermined gap which is shorter than said predetermined gap between said anode and cathode electrodes, a discharge chamber surrounding said main discharge space and said at least one preliminary discharge space thereby containing said main discharge electrodes and said set of preliminary discharge electrodes, and at least one separating wall for separating said main discharge space from said at least one preliminary discharge space, said at least one separating wall being of an insulating member through which a predetermined wavelength of light among lights induced by the discharge of said set of preliminary discharge electrodes is passed from said at least one preliminary discharge space to said main discharge space.

BRIEF DESCRIPTION OF THE DRAWINGS

The features and advantages of the invention will be more apparent from the detailed description hereunder taken in conjunction with the accompanying drawings, wherein.

DETAILED DESCRIPTION OF THE PREFERRED EMBODIMENTS

The preferred embodiments according to the invention will be explained in detail by reference to the drawings.

Figure 1:
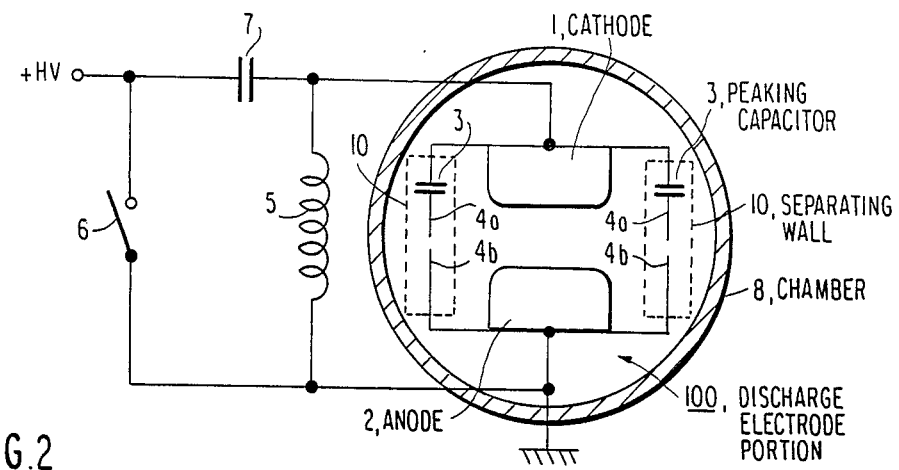
FIG. 1 is a transverse cross sectional view illustrating a transversely excited atmospheric laser which is connected to a power source circuit in the first embodiment according to the invention.

In FIG. 1, there is shown a transversely excited atmospheric $CO_2$ laser in the first embodiment according to the invention. The $CO_2$ laser comprises a discharge electrode portion 100, a discharge chamber 8 of cylindrical shape, made of material such as Al, stainless steel or epoxy resin reinforced by glass fiber, being sealed air-tightly from an outer atmosphere for containing the discharge electrode portion 100 together with laser gas, and resonant mirrors (not shown) fixed to the both ends of the cylindrical discharge chamber 8 to seal the respective ends thereof. A power source circuit including a charging and discharging coil 5, a switch 6, a storage capacitor 7, and a power source +HV is connected to the discharge electrode portion 100. In the discharge chamber 8, laser gas which is a mixture of $CO_2$, $N_2$ and He in the ratio of 1:1:8 is contained, and the pressure thereof is maintained at 1.1 atm.

The discharge electrode portion 100 comprises main discharge electrodes including a cathode electrode 1 and an anode electrode 2 facing each other with a predetermined gap in parallel, a set of preliminary discharge electrodes 4a and 4b positioned on the both sides of the main discharge electrodes and each having a discharge gap therebetween, and a set of peaking capacitors 3 each connected to each of the preliminary discharge electrodes 4a at one end and to the cathode electrode 1 at the other end. The cathode electrode 1 and anode electrode 2 of the main discharge electrodes are made of Al coated with Ni respectively, while the preliminary discharge electrodes 4a and 4b are made of brass. The gap between the preliminary discharge electrodes 4a, 4b is much shorter than the gap between the cathode electrode 1 and anode electrode 2, thereby resulting in the discharge of the preliminary discharge electrodes prior to that discharge of the main discharge electrodes. The peaking capacitors 3 and preliminary discharge electrodes 4a and 4b are contained in the respective chambers of separating walls 10 to be described later each interior of which is completely separated from a space in which laser gas is contained.

Figure 2:
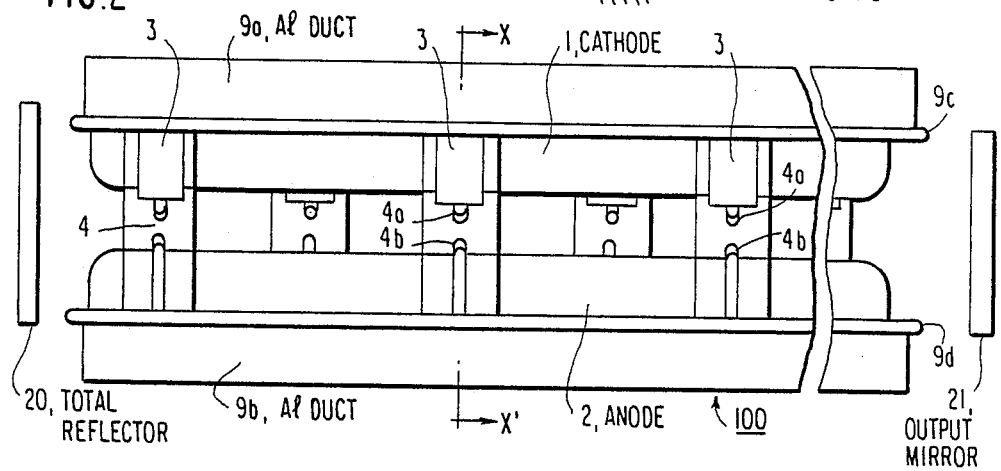
FIG. 2 is a side view illustrating main and preliminary discharge electrodes in a discharge chamber in FIG. 1.
Figure 3:
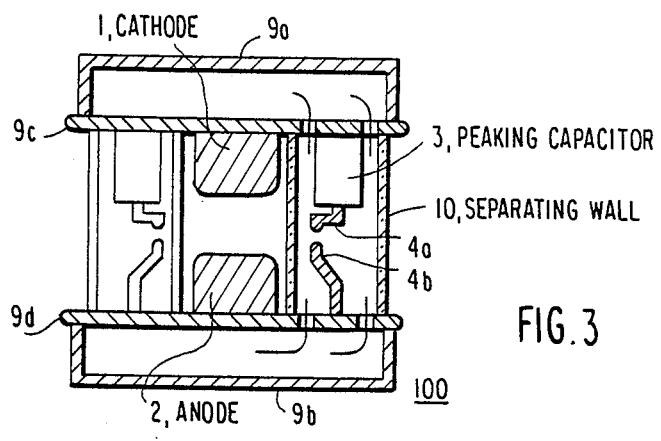
FIG. 3 is a cross sectional view taken along a line X—X in FIG. 2.

In FIG. 2, resonant mirrors including a total reflection mirror 20 and an output mirror 21 are positioned in a longitudinal direction at the both ends of the discharge electrode portion 100. As described before, the resonant mirrors are fixed to the respective ends of the cylindrical discharge chamber 8 shown in FIG. 1. Alternatively, the output mirror 21 may be positioned outside the discharge chamber 8. The cathode electrode 1 and anode electrode 2 of the main discharge electrodes are extended in a direction parallel to the optical axis of the resonant mirrors and are fixed at the bottom surfaces thereof to Al plates 9c and 9d. A plurality of the peaking capacitors 3 are positioned in a longitudinal direction of the cathode electrode 1 with a predetermined interval and are arranged on the both sides of the cathode electrode 1 alternately. Each of the capacitors 3 is connected electrically through the Al plate 9c to the cathode electrode 1. The series circuits each including the peaking capacitor 3 and preliminary discharge electrodes 4a and 4b are connected to the Al plates 9c and 9d therebetween and are sealed within the cylindrical chambers of the separating walls 10 of quartz (high purity $SiO_2$) separately on the both sides of the main discharge electrodes as shown in FIG. 3. Gas such as He for preliminary discharge is supplied from Al duct 9a fixed to one surface of the Al plate 9c into the respective cylindrical chambers formed by the separating walls 10. The gas is exhausted to Al duct 9b fixed to one surface of the Al plate 9d. In FIGS. 2 and 3, a supplying path of He gas into the duct 9a and an exhausting path thereof from the duct 9b to the outside of the chamber 8 are not shown.

Referring again to FIG. 1, the storage capacitor 7 is connected between the power source +HV and cathode electrode 1 and is connected through the charging and discharging coil 5 to the ground. At first, the switch 6 has been turned off so that the storage capacitor 7 is charged by the output of the power source +HV. Next, large potential differences are produced between the cathode electrode 1 and anode electrode 2 and between the preliminary discharge electrodes 4a and 4b when the switch 6 is turned on. As a result, the preliminary discharge takes place between electrodes 4a and 4b with arc under a high voltage applied thereto prior to the main discharge between the cathode electrode 1 and anode electrode 2 because the discharge gap of the former electrodes is much shorter than that of the latter electrodes so that ultraviolet light induced in the arc discharge passes through the respective cylindrical chambers of the walls 10 to ionize laser gas between the main discharge electrodes. In such a case, ultraviolet light which can ionize laser gas has a wavelength less than 200 nm. Thus, the peaking capacitors 3 are charged in accordance with the flow of current through the preliminary discharge electrodes in the arc discharge so that a large potential difference is produced between the cathode electrode 1 and anode electrode 2 simultaneously. Consequently, glow discharge is developed between the main discharge electrodes due to the large potential difference thus produced and ionization of laser gas so that stimulated emission light is radiated from $CO_2$ molecules excited in the glow discharge whereby laser light goes and returns between the resonant mirrors to be emitted from the output mirror 21.

The ON and OFF sequences of the switch 6 described above are repeated to emit pulsed laser light from the output mirror 21 intermittently.

In FIG. 1, unexpected discharge will occur between some of the preliminary discharge electrodes each connected to the corresponding peaking capacitor 3 at one terminal and cathode electrode 1 of the main discharge electrodes when charges are transferred from the storage capacitor 7 to the peaking capacitors 3 at the time of the discharge of the preliminary discharge electrodes, if no separating wall 10 is provided in the discharge electrode portion 100. If there is no separating wall 10, there is a disadvantage in that the energy of the storage capacitor is not supplied totally to the space of laser gas between the main discharge electrodes. On the contrary, such unexpected discharge as described above does not occur in the invention because each of the preliminary discharge spaces is separated from the main discharge space in which the main discharge electrodes are provided by the respective cylindrical chambers each composed of separating walls 10 of highly insulating material.

Figure 4:
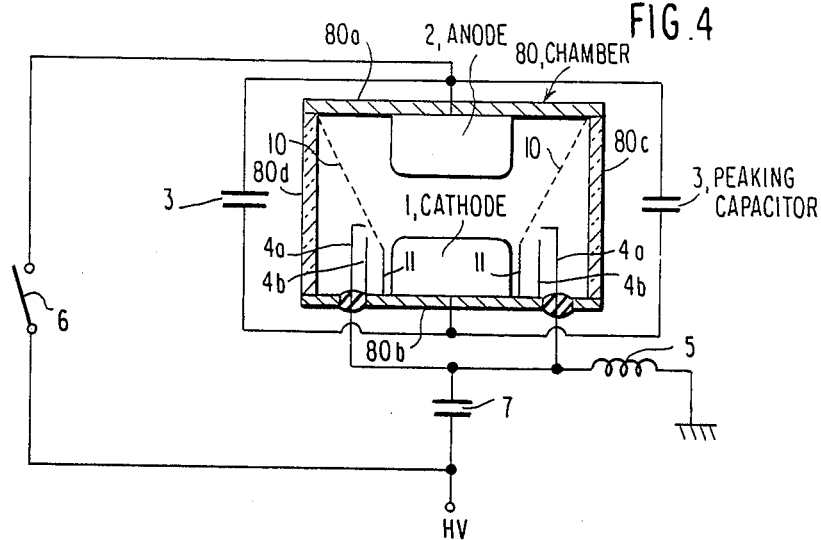
FIG. 4 is a transverse cross sectional view illustrating a transversely excited atmospheric laser which is connected to a power source circuit in the second embodiment according to the invention.

In FIG. 4, there is shown a transversely excited atmospheric laser in the second embodiment according to the invention. The transversely excited atmospheric laser comprises a cubical discharge chamber 80, discharge electrodes as mentioned in the first embodiment provided in the cubical discharge chamber 80, and resonant mirrors (not shown) fixed to seal both ends of the cubical discharge chamber 80. A power source circuit including a power source +HV, peaking capacitors 3, a charging coil 5, a switch 6, and a storage capacitor 7 is connected to the discharge chamber 80 at the outside thereof.

Figure 5:
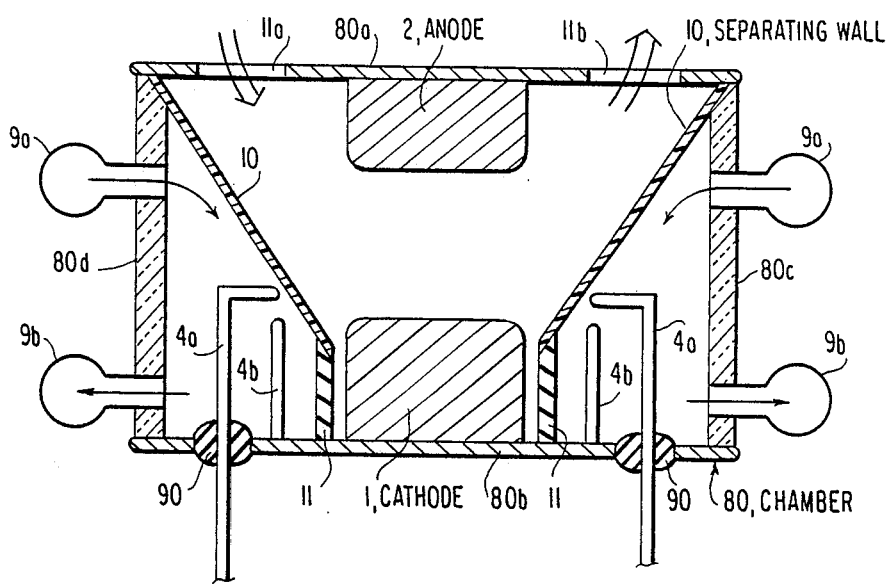
FIG. 5 is an enlarged transverse cross sectional view illustrating the laser in FIG. 4.

In FIG. 5, there is shown the discharge chamber 80 which is structured to have upper and lower plates 80a and 80b of Al and side walls 80c and 80d of epoxy resin reinforced by glass fiber. As clearly understood from the illustration in FIG. 5, the cathode electrode 1 and anode electrode 2 of the main discharge electrodes face each other with a predetermined gap in parallel to be fixed on the inner surfaces of the Al plates 80a and 80b. The main discharge electrodes are the same in their construction and material as those of the cathode electrode 1 and anode electrode 2 shown in FIG. 3, and are parallel in a longitudinal direction to the axis of the resonant mirrors. A plurality of discharge gaps each made between the preliminary discharge electrodes 4a and 4b are arranged with a predetermined interval in a longitudinal direction of the cathode electrode 1 wherein each of the electrodes 4a is connected to the storage capacitor 7 and charging coil 5 by an insulating member 90 as shown in FIG. 4, while each of the electrodes 4b is fixed to the Al plate 80b. A pair of insulating plates 11 of epoxy resin reinforced of glass fiber are provided in parallel to the cathode electrode 1 on both sides thereof to separate the preliminary discharge electrodes 4b therefrom. The pair of the insulating plates 11 are fixed at the upper ends thereof to the respective lower ends of separating walls 10 of quartz, while the respective upper ends of the separating walls 10 are fixed to the respective upper and inside ends of the insulating side walls 80c and 80d so that the main discharge space and preliminary discharge spaces are separated from each other by the separating walls of the quartz walls 10 and insulating plates 11. The main discharge electrodes are contained in the main discharge space, and the preliminary discharge electrodes 4a and 4b are contained in the preliminary discharge spaces. The same laser gas as used in the first embodiment is supplied through gas supplying apertures 11a into the main discharge space and exhausted through exhausting apertures 11b therefrom. The gas supplying and exhausting apertures 11a and 11b are connected to a laser gas circulating path (not shown) in which laser gas is circulated. He gas is supplied into each of the preliminary discharge spaces from a supplying duct 9a and is exhausted to an exhausting duct 9b therefrom. The supplying and exhausting ducts 9a and 9b are connected to a He gas circulating path (not shown).

The peaking capacitors 3 are positioned outside the discharge chamber 80 and are connected at the both terminals to the Al plates 80a and 80b thereof as shown in FIG. 4 in the second embodiment, although the peaking capacitors 3 are positioned in the respective cylindrical chambers of the separating walls in the discharge chamber 80 in the first embodiment.

The storage capacitor 7 is charged by the output of the power source +HV when the switch 6 has been turned off. Next, charges of the storage capacitor 7 are transferred to the peaking capacitors 3 so that large potential differences are produced across the preliminary discharge electrodes 4a and 4b and across the cathode electrode 1 and anode electrode 2 when the switch 6 is turned on. As a result, the preliminary discharge takes place in the spaces between electrodes 4a and 4b with arc prior to the discharge of the main discharge electrodes because the discharge gap of the preliminary discharge electrodes 4a and 4b is much shorter than that of the main discharge electrodes so that ultraviolet light induced in the arc discharge passes through the respective separating walls 10 to ionize laser gas in the main discharge space. The main discharge is developed between the cathode electrode 1 and anode electrode 2 when the peaking capacitors 3 are further charged in the arc discharge and a large potential difference is produced between the cathode electrode 1 and anode electrode 2. At the present moment, glow discharge is developed due to the ionization of laser gas. $CO_2$ molecules are excited in the discharge to radiate stimulated emission light which is thereby emitted from the output mirror.

In the first and second embodiments, it is possible to supply ultraviolet light having high energy produced in stable preliminary discharge. In addition the preliminary discharge electrodes are not damaged because the structure allows the use of such rare gas as He which is different from laser gas.

The rate of circulating or flowing gas for the preliminary discharge is extremely low because rare gas like He etc. is not dissociated easily due to a high dissociation energy.

As clearly understood from the aforementioned equation (1), it is possible to control the amount of photoelectrons in the preliminary discharge by controlling a molecular number N because gas pressure in the preliminary discharge space can be varied independently of laser gas in the main discharge space.

It is possible to set considerably flexible preliminary ionizing conditions as compared to the conventional laser because the selection of an appropriate gas provides a more appropriate wavelength of light in the preliminary discharge. As a result, the optimum conditions which were not obtained in the past can be selected in regard to a kind and pressure of gas in the preliminary discharge space.

As a matter of course, air can be used as gas in the preliminary discharge space in place of rare gas or mixing gas mentioned before. In such a case, the construction can be designed to be simplified and smaller.

Further, the preliminary discharge electrodes can be nearer the main discharge space because a high voltage across the preliminary discharge electrodes does not leak in a direction toward the main discharge electrodes because the main discharge space and preliminary discharge spaced are separated from each other. For this reason, the density of photoelectrons in the preliminary ionization can be larger in accordance with the equation (1). In other words, the density of photoelectrons can be considerably larger as compared to the conventional laser because this is at the inverse square of the distance r. As a matter of course, the density preferably is set to be of an optimum value. On the other hand, laser gas is deteriorated if the density of ultraviolet light is more than an allowable value in a case where the preliminary discharge electrodes is made much nearer the main discharge electrodes. In such a case, a smaller number of preliminary discharge electrodes would be appropriate in order to avoid the disadvantage.

The construction can be smaller yet by decreasing the number of the preliminary discharge electrodes, and accordingly, the number of the peaking coils, and by making the distance between the main discharge electrodes and preliminary discharge electrodes smaller.

In the result of the experiment on the transversely excited atmospheric $CO_2$ laser, the life of laser gas contained therein in the construction described in the first and second embodiments can be extended up to 3 to 10 times depending upon the mixing ratio of laser gas.

The invention is applied to all types of transversely excited atmospheric lasers, that is, not only to a $CO_2$ laser, but also to an XeCl excimer laser.

Although the invention has been described with respect to specific embodiments for complete and clear disclosure, the appended claims are not to thus limited but are to be construed as embodying all modifications and alternative constructions that may occur to one skilled in the art which fairly fall within the basic teaching herein set forth.

What is claimed is:

1. A transversely excited atmospheric laser comprising:
    a pair of main discharge electrodes including an anode electrode having a first predetermined length and extending in a predetermined direction, and a cathode electrode having a second predetermined length and extending in said predetermined direction and disposed opposite and parallel to said anode electrode with a first predetermined gap therebetween to provide a main discharge space;
    at least one set of preliminary discharge electrodes, including a pair of electrodes facing each other with a second predetermined gap therebetween which is shorter than said first predetermined gap to provide at least one preliminary discharge space adjacent said main discharge space;
    means for applying a first high voltage to said main discharge electrodes and a second high voltage to said at least one set of preliminary discharge electrodes to cause an arc discharge in said second predetermined gap;
    a discharge chamber surrounding said main discharge space and said at least one preliminary discharge space thereby containing said main discharge electrodes and said at least one set of preliminary discharge electrodes;
    at least one separating wall, made of an insulating material, for separating said main discharge space from said at least one preliminary discharge space to provide a gas-tight sealing and for passing an ultraviolet light emitted by said arc discharge from said at least one preliminary discharge space to said main discharge space; and
    a laser gas filling said main discharge space and preionized by said ultraviolet light.

2. A transversely excited atmospheric laser according to claim 1,
    wherein said main discharge space is filled with a first laser gas and said at least one preliminary discharge space is filled with a second laser gas, different from said first laser gas.

3. A transversely excited atmospheric laser according to claim 2, wherein said first laser gas is a mixture of $CO_2$, $N_2$, and He.

4. A transversely excited atmospheric laser according to claim 3,
    wherein said mixture is in a ratio of 1:1:8.

5. A transversely excited atmospheric laser according to claim 2,
    wherein said second laser gas is a gas selected from the group consisting of rare gases.

6. A transversely excited atmospheric laser according to claim 2,
    wherein said second laser gas is He.

7. A transversely excited atmospheric laser according to claim 2,
    wherein said second laser gas is air.

8. A transversely excited atmospheric laser according to claim 1,
    wherein a plurality of said pair of electrodes in said at least one set of preliminary discharge electrodes are arranged on the both sides of said main discharge electrodes alternately and are contained in respective chambers each composed of said separating wall.

9. A transversely excited atmospheric laser according to claim 1,
    wherein said predetermined wavelength is less than 200 nm.

10. A transversely excited atmospheric laser according to claim 1,
    wherein said insulating material is quartz.

11. A transversely excited atmospheric laser according to claim 1, further comprising peaking capacitors respectively connected to ones of said at least one set of preliminary discharge electrodes, said peaking capacitors being disposed within said discharge chamber.

12. A transversely excited atmosphere laser according to claim 1, further comprising peaking capacitors respectively connected to ones of said at least one set of preliminary discharge electrodes, said peaking capacitors being disposed outside said discharge chamber.

13. A transversely excited atmospheric laser according to claim 1,
    wherein a distance between said at least one set of preliminary discharge electrodes and said main discharge electrodes is sufficient to promote uniform preliminary ionization in said main discharge space, and to prevent unexpected discharge.

* * * * *